United States Patent [19]
Chow

[11] Patent Number: 5,401,057
[45] Date of Patent: Mar. 28, 1995

[54] STRUCTURAL ADDITIONS FOR BOOSTING LATERAL EFFECTIVENESS

[76] Inventor: Andrew W. Chow, 15514 Fawn Villa, Houston, Tex. 77068

[21] Appl. No.: 90,929

[22] Filed: Jul. 14, 1993

[51] Int. Cl.⁶ ............................................. B62D 7/22
[52] U.S. Cl. ................................... 280/788; 180/905
[58] Field of Search ................ 280/788, 112.2, 688; 180/905

[56] References Cited

U.S. PATENT DOCUMENTS

| | | | |
|---|---|---|---|
| 1,979,192 | 10/1934 | Burney | 280/112.2 |
| 3,565,456 | 2/1971 | Zoltok | 280/788 |
| 5,012,885 | 5/1991 | Hilden | 280/788 |

OTHER PUBLICATIONS

Business Week, Jun. 14, 1993, p. 89, "Spain's Tilt Train is a Low-Tech Oldie That Keeps on Rollin'".

*Primary Examiner*—Kenneth R. Rice

[57] ABSTRACT

Structural Additions for Boosting Lateral Effectiveness improves on existing suspension systems to resist carbody rotation during turns around curves. Lateral structural additions increase the separation of springs and shock absorbers to increase a vehicle's rotational stiffness against rolls caused by lateral inertial forces. Vertical structural additions change the magnitude and direction of the moment that causes a vehicle's body to roll. The combination of lateral and vertical structural additions allows the design of vehicle suspension systems that can provide simultaneously smooth ride and good turning performance.

2 Claims, 2 Drawing Sheets

STRUCTURAL ADDITIONS FOR BOOSTING LATERAL EFFECTIVENESS

Structural Additions for Boosting Lateral Effectiveness, hereafter STABLE, improves a vehicle's resistance to rotation around its longitudinal axis; rotation is produced by lateral inertial forces generated in a turn. Longitudinal is defined herein as the vehicle's direction of travel, and the lateral direction is parallel to the axle of the vehicle and perpendicular to the longitudinal direction. STABLE reduces vehicle rotation that gives rise to the sensation by a rider of falling out of his chair, with the vehicle body rolling out of the turn. STABLE suspension also can change the rotational moment from the lateral inertia that causes the vehicle body to roll.

OBJECTIVES AND ADVANTAGES OF INVENTION

The following is claimed as objectives and advantages of the current invention: to provide improved suspension with greater rotational stiffness, meaning greater resistance to body rotation, to provide suspension that offers a softer ride for a given design stiffness against rotation, to provide suspension that could be designed for optimal vertical dynamic response without regard for body-roll needs, and to provide suspension that permits greater designer control over the moment produced by the vehicle's body during a turn.

DISCUSSION OF PHYSICS AND EXISTING SUSPENSION

The lateral inertia of a turning vehicle Generates a moment that causes the vehicle to roll. The moment is dependent on the vehicle's mass and speed, the turn radius, the height of the center of gravity of the vehicle above the ground. To balance this moment are coupled forces created by greater compression at the wheels on the outside of the turn, matched by corresponding reduction of load at the inside wheels. The capacity of the balancing coupled forces to resist the moment is determined by the lateral separation of the wheels.

To improve performance, the overturning moment could be reduced by lowering the vehicle's center of Gravity. Also, the wheels could be moved apart as much as possible to increase overturning stability. Other than these two basic elements that can be readily incorporated into a vehicle's design, the dynamic behavior of a vehicle body can be optimized further by judicious placement and selection of shock absorbers and suspension springs connecting the body to structural supports to the wheels.

Figure 1:
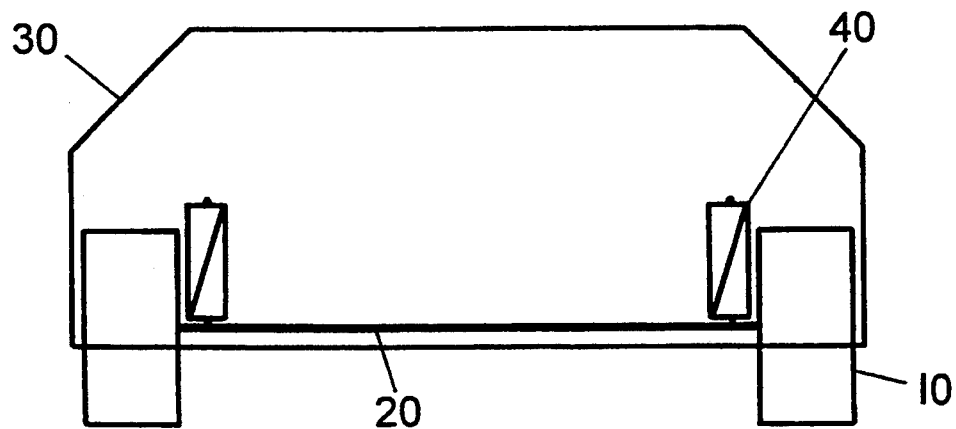
FIG. 1 shows a conventional suspension system for a car.

FIG. 1 illustrates the elements of a car, showing two wheels 10 connected by axle 20. Car body 30 is attached rigidly by support elements to axle 20 in the longitudinal and lateral directions. Car body 30 is supported vertically over axle 20 by two sets of springs/shock absorbers 40. To improve performance, automobile makers have increased the separation of springs/shock absorbers 40 to maximize the rotational stiffness of the suspension. For some cars, the disc brakes are squeezed into the space within the wheels to permit widest separation of struts. Given state-of-art designs, further increase in rotational stiffness could only be attained by the use of stronger springs, thus raising the natural frequency of dynamic response and producing a stiff ride. For a-high-performance car the stiff ride is marketed by auto manufacturers as the feel of the road.

DESCRIPTION OF INVENTION

The present invention is borne out of the fact that dynamic response of a vehicle's body can be separated from, but still coupled with, the wheels and associated connecting structures, and the behavior of the body can be improved by controlling rotational stiffness and the moment that the body is allowed to produce when the vehicle turns.

Figure 2:
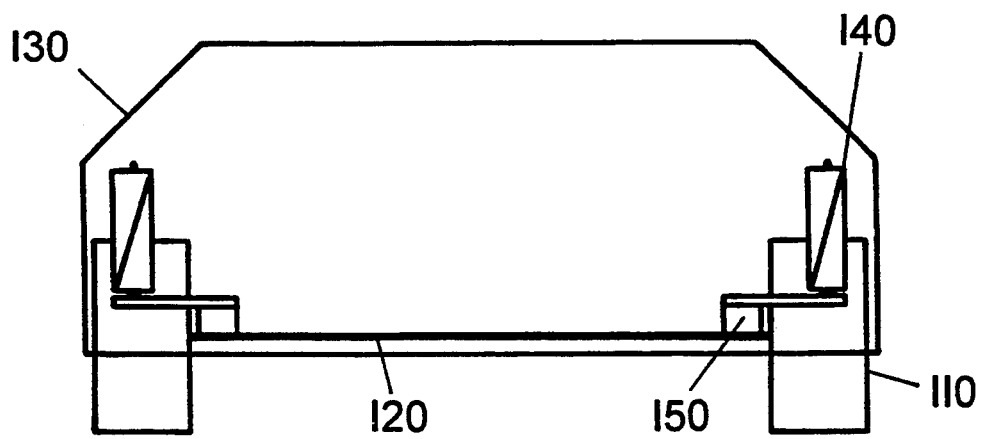
FIG. 2 shows a STABLE suspension that reduces body roll.

FIG. 2 shows a STABLE suspension. Two wheels 110 are connected by axle 120. Car body 130 is attached rigidly by support elements to axle 120 in the longitudinal and lateral directions. Car body 130 is supported vertically by two sets of springs/shock absorbers 140 over two lateral structural additions 150 which are firmly attached to axle 120. With the lateral structural additions 150 providing rigid support points around the wheels, the separation of the springs/shock absorbers 140 is increased. Therefore, the embodiment in FIG. 2 has a higher rotational stiffness for any given size springs when compared to existing vehicle designs. Stated in another way, lateral structural additions 150 permit the use of softer springs for any given rotational stiffness when compared to existing designs, giving a softer ride and a lower natural frequency of vibration. Lateral structural additions 150 can be attached to vehicles with independent suspension. Also, lateral structural additions 150 could provide rigid support points around the top, versus around the side shown in FIG. 2, of a vehicle's front wheels to facilitate steering.

Figure 3:
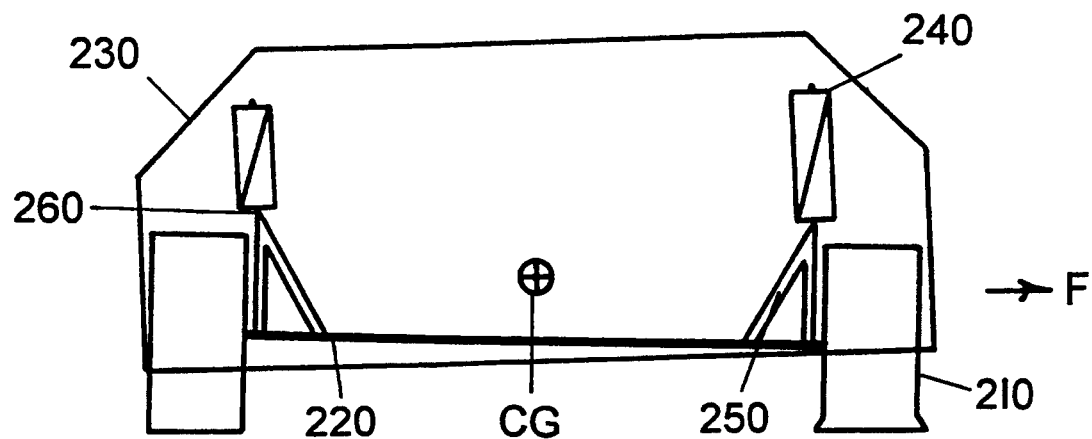
FIG. 3 shows another STABLE suspension that permits greater control over the moment produced by the body.

FIG. 3 shows another aspect of STABLE suspension. Two wheels 210 are connected by axle 220. Car body 230 is attached rigidly by support elements to the axle in the longitudinal direction. Car body 230 is shown supported in the vertical direction by two sets of springs/shock absorbers 240 over two vertical structural additions 250 which are firmly attached to axle 220. It should be noted that springs/shock absorbers 240 could connect car body 230 directly to axle 220. The main feature of this STABLE design is that car body 230 is attached by support elements rigidly in the lateral direction to the vertical structural additions 250 at elevation 260 vertically above axle 220.

When a vehicle is subject to lateral inertial force F in FIG. 3, overall vehicle equilibrium is maintained by clockwise rigid rotation of wheels 210 and axle 220 as shown by compression of wheel 210 on the right side, and uplift on the left side. For the body, dynamic response is dependent on the elevation 260 of vertical structural additions 250. Starting at the level of the axle, steadily raising elevation 260 vertically above axle 220 would gradually reduce the moment created by the inertial force of body 230 measured at its lateral support at elevation 260. When elevation 260 is raised above the car body's center of gravity CG, the moment changes sign, causing car body 230 to roll in the opposite direction, shown as counter clockwise rotation in FIG. 3.

If the size of vertical structural additions 250 is selected with elevation 260 set at the exact height of center of gravity CG, car body 230 would not rotate during a turn relative to wheels 210 and axle 220 as the body's laterally induced moment is zero. A car with this setup would roll in a turn to the extent of the overall rotation of the vehicle due to give of the tires and the minimal flexibility of the steel support structures.

Figure 4:
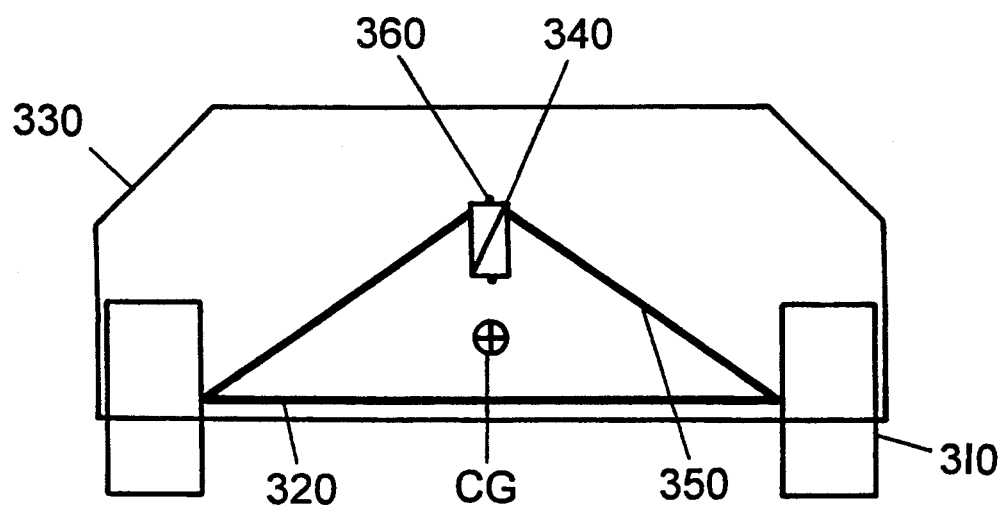
FIG. 4 shows a special version of STABLE suspension where the body acts like a pendulum.

FIG. 4 shows a special case of the embodiment from FIG. 3 where the two vertical structural additions 250 are moved together to form one vertical structural addition 350. Two wheels 310 are connected by axle 320. Car body 330 is attached by support elements rigidly to axle 320 in the longitudinal direction. Car body 330 is hung on springs/shock absorbers 340 from vertical structural addition 350 at elevation 360, which is above the center of gravity CG of car body 330. In this special case, passengers in the vehicle will experience lateral inertial forces as loads directly on the seat, with car body 330 acting like a pendulum.

It should be noted that the invention described above only affects dynamic forces internal to the vehicle, affecting the response of the body. Internal forces do not change the physics of overall vehicle stability with respect to roll overs, which as stated previously is governed by height of overall center of gravity, wheel separation, vehicle velocity, and radius of turn.

SUMMARY OF INVENTION

Lateral structural additions; increase the separation of springs and shock absorbers to increase rotational stiffness against rotation caused by lateral inertial forces. Vertical structural additions change the moment that causes vehicle bodies to roll. Combining lateral and vertical structural additions provides flexibility in the design of vehicle suspension systems to achieve a smoother ride and to provide better performance on turns.

I claim:

1. A vehicle suspension system comprising:
vehicle body;
front and rear wheels;
at least one font axle;
at least one rear axle;
vertical structural additions; and
springs;
with said front axle connecting said front wheels;
with said rear axle connecting said rear wheels;
with said vertical structural additions rigidly attached to and located above the front and the rear axles;
with said vehicle body attached in the longitudinal direction by longitudinally rigid means to each assembly of axle and vertical structural additions;
with the vehicle body supported vertically over each assembly of axle and vertical structural additions by said springs; and
with the vehicle body attached in the lateral direction by laterally rigid means to only the vertical structural additions at elevation above the axles.

2. A vehicle suspension system comprising:
vehicle body;
front and rear wheels;
at least one front axle;
at least one rear axle;
vertical structural additions; and
springs;
with said front axle connecting said front wheels;
with said rear axle connecting said rear wheels;
with said vertical structural additions rigidly attached to and located above the front and the rear axles;
with said vehicle body attached in the longitudinal direction by longitudinally rigid means to each assembly of axle and vertical structural additions; and
with the vehicle body hung vertically by said springs from the vertical structural additions while locating center of gravity of vehicle body below the springs.

* * * * *